United States Patent [19]

Cooper

[11] Patent Number: 4,582,724
[45] Date of Patent: Apr. 15, 1986

[54] CHEMICAL BONDING AGENT FOR THE SUPPRESSION OF "RUSTY BOLT" INTERMODULATION INTERFERENCE

[75] Inventor: John C. Cooper, Burke, Va.

[73] Assignee: The United States of America as represented by the Secretary of the Navy, Washington, D.C.

[21] Appl. No.: 726,563

[22] Filed: Apr. 23, 1985

[51] Int. Cl.$^4$ .............................................. B05D 5/12
[52] U.S. Cl. ...................................... 427/125; 427/58; 427/123; 427/126.1; 427/383.1; 427/388.1; 252/82; 252/518; 252/519
[58] Field of Search ...................... 427/58, 126.1, 123, 427/125, 383.1, 388.1; 252/82, 518, 519; 156/60, 331.6

[56] References Cited

U.S. PATENT DOCUMENTS

| | | | |
|---|---|---|---|
| 4,325,744 | 4/1982 | Panayappan et al. | 134/4 |
| 4,424,079 | 1/1984 | Barabas | 134/4 |
| 4,451,296 | 5/1984 | Barabas | 134/4 |

OTHER PUBLICATIONS

Cooper et al., "Clinically Suppressing Rusty Bolt Intermodulation Interference", printed in EMC Technology & Interference Control News, vol. 4, No. 1, p. 63 (1985).
Cooper et al., "Chemically Suppressing Rusty-Bolt Intermodulation Interference", Proc. IEEE National Symposium on EMC, Apr., 1984, pp. 233–240.

*Primary Examiner*—Richard Bueker
*Attorney, Agent, or Firm*—Robert F. Beers; William T. Ellis; Wendell R. Guffey

[57] ABSTRACT

A Chemical Bonding Agent composition suitable for reducing Intermodulation Interference caused by "rusty bolts" which comprises a complexing polymer, a metal salt, a mild reducing agent, and a suitable solvent.

8 Claims, 4 Drawing Figures

CHEMICAL BONDING AGENT FOR THE SUPPRESSION OF "RUSTY BOLT" INTERMODULATION INTERFERENCE

BACKGROUND OF THE INVENTION

Intermodulation Interference (IMI) occurrs when high frequency (HF) transmitters and receivers are placed in close proximity, particularly on ships and aircraft, due to non-linear conduction through metal-oxide-metal (MOM) junctions in the supporting structure. This is also known as "rusty bolt" intermodulation interference. IMI is a problem where there are any non-welded metal-to-metal joints but causes particular problems on ships due to MOM junctions in or at life lines, ladders, flag poles, bond straps, boat davits, stays, nets, chains, etc. Steel, aluminum, brass and copper are examples of common metals that form MOM Junctions but any metal that can form an oxide can form a MOM junction. MOM junctions interfere with signal transmission throughout the HF to infrared range, but causes particular problems for communications in the 2-30 MHz region and for VHF frequencies.

The electrical behavior of the MOM junction responsible for the IMI is similar to that of two parallel back-to-back semiconductor diodes, each operating in its forward conducting region. The non-linear conduction of the MOM junction or the analagous diode configuration is the mixing mechanism that generates IMI. This mixing action, and thus the IMI, can be suppressed if the current through the MOM junction is by-passed through a linear conductive path, i.e., one with low resistance or low reactance.

Eliminating or reducing IMI by providing a linear conductive path has traditionally been accomplished by clamping or welding conductive ground straps across the MOM junction thus shorting-out the MOM junction or by replacing the MOM junction with non-conductive material thus eliminating the MOM junction. These solutions, although effective, have limitations. Using non-conductive materials is prohibitive where structural strength or electrical conductivity is required. Welding or clamping straps cannot be used where there is a multiplicity of MOM junctions, such as in chains or twisted cable, or where dissimilar metals are involved. Additionally, the use of non-conductive materials or conductive straps is very expensive. To overcome these limitations while effectively reducing IMI, an inexpensive method that maintains the structural integrity of supporting hardware while providing a highly conductive current path is required.

The chemical composition of the present invention used to overcome IMI contains compounds similar to "rust removal compositions" which have incorporated the general principles of chelating the ferric ion, incorporating the ion into a polymer material, and removing the "rust" with one polymer material. Barabas, U.S. Pat. No. 4,424,079, used a vinylpyrrolidone/maleic acid co-polymer to remove rust by this general technique. Panayappan, in U.S. Pat. No. 4,325,744, used a vinylpyrrolidone/ethylenediaminetetraacetic acid (EDTA) or similar chelating agent to encapsulate rust which can be peeled from the surface and disposed of as a solid waste. Neither of these references, however, contemplate changing the oxidation state of the metal to increase conductivity, consider the application of the composition to nonferric oxides, or consider incorporation of a chemical reducing agent that would prevent further corrosion and IMI generation. Although it is general practice to add metal filings or other conductive materials to paints to make them conductive for shielding applications, no other work attempts or contemplates use of such materials for IMI suppression, nor have others attempted in situ reduction of metal ions in the presence of chemical reducing agents to enhance conductivity of the resulting mixtures by eliminating surface oxide coatings on the metal particles and resulting in very small particles. Thus, the usefulness of these techniques is limited to "rust removal" processes involving ferric ions. The references do not consider increasing structural intergity or providing more conductive paths necessary to reduce IMI, applications to other metals, or inhibition of further corrosion.

A method is, therefore, needed which can eliminate IMI by providing a low resistance and low reactance linear conductive current path through potential MOM Junctions.

SUMMARY OF THE INVENTION

Figure 1:
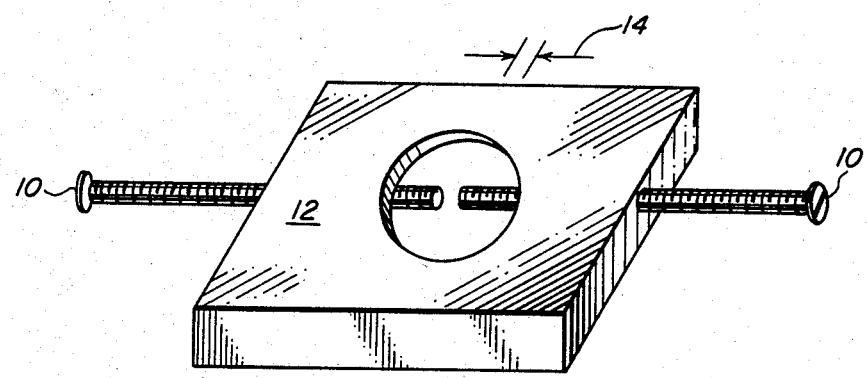
FIG. 1 is a schematic diagram of a bakelite bracket used to test the conductivity of the composition.

It is, therefore, an object of this invention to reduce IMI by providing a linear conductive path at potential MOM junctions.

It is another object of this invention to convert MOM junctions to linear conductive current paths, thus eliminating IMI.

It is another object of this invention to protect the metal surface from further corrosion thus eliminating further oxidation which causes MOM junctions.

It is a further object of this invention to minimize the amount of metal salt used in the composition by reducing the metal ions in situ to form very finely divided metal particles with little or no surface oxide coating that would reduce the overall conductivity.

It is a further object of this invention to insure good electrical contact with the metal surfaces to which the composition is bonded by removing the surface oxide coating using a complexing polymer, inhibiting further oxidation by incorporating a reducing agent to scavenge oxygen, and forming of an inert polymer film at the metal surfaces.

These and other objects are accomplished using a Chemical Bonding Agent (CBA) which comprises a complexing polymer, a metal salt, a mild reducing agent, and a suitable solvent. The composition forms a CBA which can penetrate the MOM junction and remove the metal oxide, provide a low resistance-low reactance current path, form a structurally hard compound which remains between the metal surfaces, and inhibit further corrosion on the metal surfaces.

In the preferred embodiment of the invention about 13 percent by weight of PVP, 13 percent by weight of erythrobic acid, 6 percent by weight of silver nitrate, and about 68 percent by weight of water are mixed by combining first the PVP and erythorbic acid in water and adding to this a solution of the silver nitrate in water.

Other objects, advantages, and novel features of the present invention will become apparent from the following detailed description of the invention.

DETAILED DESCRIPTION OF THE INVENTION

The CBA composition of the present invention comprises a mixture of a complexing polymer, a solvent, a metal salt, and a reducing agent. The polymer and solvent can be used alone or, alternatively, the composition can contain the metal salt and reducing agent. The mixture should consist of between 10-90 percent by weight of the complexing polymer, between 0-35 percent by weight of the reducing agent, between 0-40 percent by weight of the metal salt, and between 10-80 percent by weight of the solvent.

The complexing polymer may be any complexing linear or slightly-branched polymer preferably selected from polyamines, acrylamides, ketoamides, and linear polyketones. The polyketones are most preferred when used on aluminum junctions. The preferred complexing polymers are poly(N-vinylpthalamide) and polyvinyl pyrrolidone (PVP), with polyvinyl pyrrolidone being most preferred due to its availability, low cost, and ease of oxidation, and complexation by metal ions.

The solvent or vehicle may be any liquid in which the components are soluble. This includes water, alcohols and many others, although the preferred solvent is water due to its polar nature, moderate evaporation rate, low cost, and non-toxicity. The selection of the solvent is not critical as long as it is compatable with the other components and will evaporate to leave a solid composition at the MOM junction.

The metal salt may contain any metal ion reduced by the polymer or reducing agent in the mixture. The metal may be, but is not limited to, silver, copper, zinc, mercury, iron, or cadmium. Copper, silver, or iron are preferred with silver being the most preferred.

The reducing agent can be any mild reducing agent chemically compatable with the polymer and solvent, although strong acids or primary amines, because of their tendancy to cause corrosion should be avoided. Complexing reducing agents are preferred since the rate of reduction of the metal ions is much faster and the complexing contributes to small particle formation. The small particle size and physical separation of individual metal atom is produced by the chelation and subsquent chemical reduction of the metal ions to low or zerovalent metal atoms in the viscous chelating polymer. The physical separation of the resulting metal atoms combined with evaporation of the solvent in an increasingly viscous medium inhibits aggregation, resulting in very small particles that are able to migrate easily into pourous oxide films. The preferred reducing agents include, but are not limited to, ascorbic acid, erythorbic acid, and hydroxylamine. These seem to work equally well in the present invention, although erythrobic acid is most preferred because it is least costly.

In the preferred embodiment of the invention about 13 percent by weight of PVP, 13 percent by weight of erythrobic acid, 6 percent by weight of silver nitrate, and about 68 percent by weight of water are mixed by combining first the PVP and erythrobic acid in water and adding to this a solution of the silver nitrate in water to form a slightly viscous gray mixture which can be applied to metal surfaces by any common means, preferably painting or spraying.

The mixture produced by mixing the components has a high conductivity. The silver is the primary contributor to the high conductivity, although some initial reduction in IMI may be due to the dielectric constant of the water. The reduction in IMI is stable, however, after the water has evaporated. The high conductivity creates a low resistance current path through the junction, thus limiting current flow through any remaining or subsequently formed MOM junctions. The mild reducing agent inhibits further corrosion and formation of MOM junctions and prevents surface oxide formation on the entrained metal particles thus insuring continued low resistance. Unlike commerically available metal-filled paints, these CBAs, as a result of in situ reduction, have much lower resistance for a given metal content, and the smaller particles migrate into the pourous oxides to form good electrical contact with the metal surface. Also, unlike existing preparations, the complexing polymer clean the thin oxide coating from the surface of the metals, insuring good adhesion and good electrical contact.

The PVP is cross-linked by metal ions removed from the metal oxide thus producing a structurally strong, hard material that sets in place and remains there to provide structural integrity at the junction. The complexing nature of the polymer insures ease of application and stability once applied by cross-polymerization by the metal ions, causing a change in viscosity from low to very high as the mixture "sets". The PVP is also a mild reducing agent which prevents future oxidative or electrolytic corrosion.

The resulting composition forms a CBA that contains very finely divided low valent or zero valent metal uniformly dispersed in a complexing polymer. This CBA can penetrate MOM Junctions and remove the metal oxide or penetrate the pores of any remaining oxide, provide a low resistance current path, form a structurally hard compound which remains between the metal surfaces, inhibit further corrosion of the metal surfaces, and carry several amperes of current without breakdown. In addition, the CBA has sufficient conductivity that it can be used in lieu of commercially available metal-filled paints with up to 10 times the metal content in applications such as circuit-board traces EMI shielding, and conductive gaskets for electronic chasis.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE I

A rusty bolt was created by placing together two pieces of steel key stock. A two tone rf generator was attached to the junction, feeding signals at 2.000 and 2.828 MHz. A spectrum analyser recorded the IMI produced before and after addition of the CBA, in the 0-30 MHz region. A curve tracer operating at 60 Hz and capable of providing several amps of current to the junction, was used to observe a change from non-linear to linear. 31.8 g PVP and 31.8 erythorbic acid were dissolved in 160 ml of distilled water and mixed with a solution of 15.7 g silver nitrate in 10 ml water. The resulting gray mixture was applied to the junction. The result was an immediate and stable reduction of IMI by at least 47 dB in the 2-30 MHz region. This mixture, labeled 603B, was tested aboard the USS Josephus Daniels on several junctions identified with an NM25T portable receiver while two of the ships transmitters were operating in the HF region. Measurements with the NM25T showed reduction in IMI at the orders tested to below the detectable limits, about 27 dB, in all cases. The ship was revisited 49 days later and those junctions were still not detectable.

EXAMPLE II

A solution of 2.8 g PVP with 2.8 g erythorbic acid in 12 ml water was mixed with a solution of 1.4 g silver nitrate in 0.5 g water and tested using the same procedure as described for Example I. The results were sililar to those obtained in Example I. The result was an immediate and stable reduction of IMI by at least 47 dB in the 2-30 MHz region.

EXAMPLE III

FIG. 1 is a schematic diagram of a test fixture consisting of two steel screws 10 held in a bakelite bracket 12. The gap 14 was adjusted to 0.015 cm. A mixture composed of a 1:2 ratio of erythorbic acid and GAF K90 PVP in a small amount of water was applied to this gap. The resistance of this junction was tested with a VOM and showed a resistance of 0.2 ohms. The junction was stable for several days and withstood some changes in the gap distance. The conductivity path withstood currents of one ampere and continued to conduct even when all the water had evaporated. The resulting low resistance should serve as an adequate shunt for IMI sources, although an IMI test system did not exist at that time for testing of IMI reduction. Later experiments with descrete resistive shunts confirmed this hypothesis.

EXAMPLE IV

Figure 2:
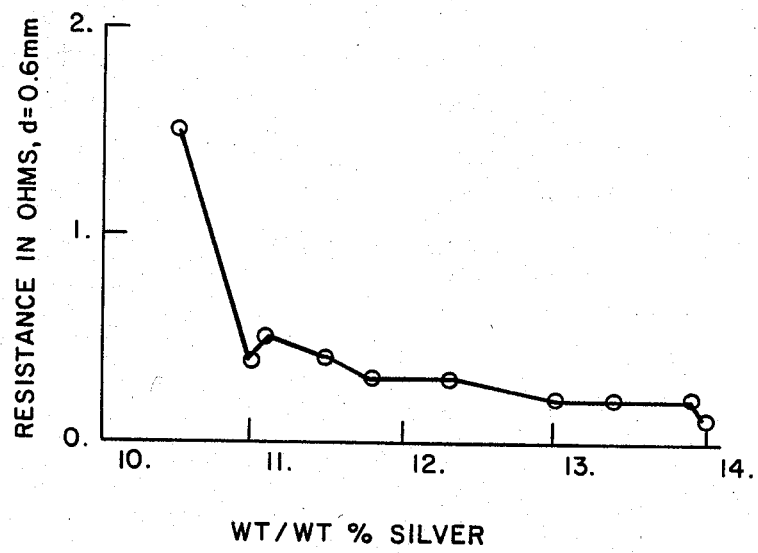
FIG. 2 is a graph of the conductivity of the composition when the concentration of silver is varied by changing the PVP concentration.

Finaly divided silver was prepared in situ by reduction of silver nitrate with erythorbic acid by the following procedure. To 7.5 g silver nitrate in 50 ml of pure water was added a solution of 6.4 g erythorbic acid dissolved in 40 ml pure water. The solutions had first been purged of oxygen. The resulting silver precipitate was sealed in an air-tight vial and used in the following experiment as "wet silver". Mixtures were prepared of the above prepared wet silver with PVP and erythorbic acid. In each mixture, 0.3 g erythorbic acid and 1.8 g "wet silver" were mixed with varying amounts of PVP and applied to the test device described in Example III as shown in FIG. 1 for resistance measurements. The PVP varried from 0.6 g to 1.0 g, resulting in a measured resistance for a gap distance of 0.6 mm of 0.1 ohm to 19 Mohm. The results, except the 19 Mohm point, are shown in the FIG. 2. The mixture is estimated to be about 3 to 5 times as effective as commercially available silver filled paints, due to the small size of the particles, the in situ preparation of the metallic silver which precludes oxide formation, and the presence of a reducing agent to prevent oxide formation. A sharp break occurs at about 9 percent silver due to increased mean distance between silver particles.

EXAMPLE V

A solution of 0.6 g erythorbic acid, 0.5 g PVP, and 1.0 g water was added to either 0.75 g cupric oxide suspended in 0.5 ml water or to 0.8 g cupric chloride in 0.5 ml water. The resulting mixtures were heated to about 40° C. In both cases a red finely divided copper metal precipitate formed, although the cupric chloride first formed an intermediate brownish-green mixture. The resulting mixture was found to be similarly conductive to the silver containing mixtures described above.

EXAMPLE VI

Figure 3A:
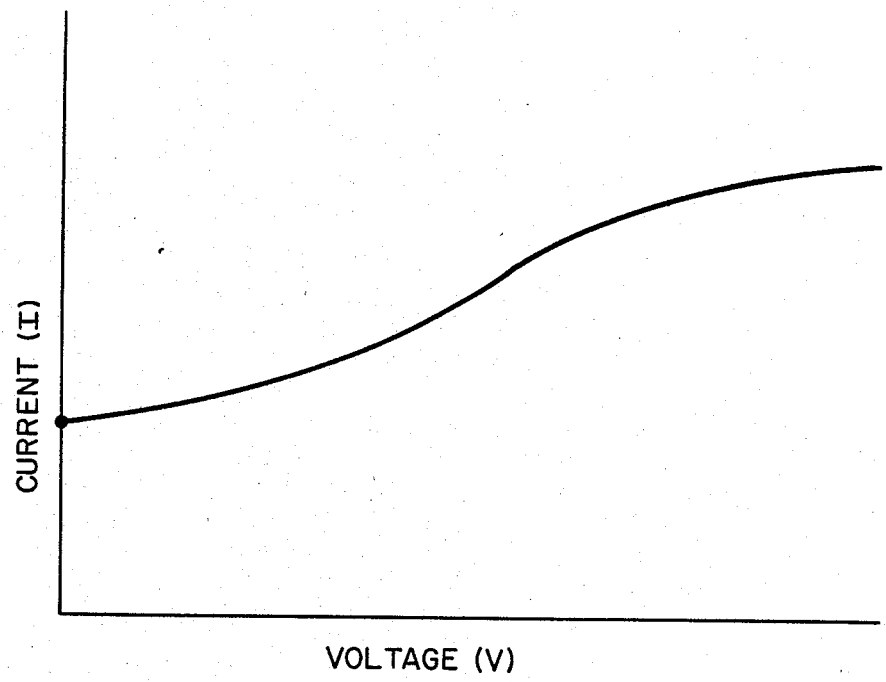
FIGS. 3A and 3B are graphs of the traces obtained with an oscilloscope before and after a simulated MOM junction was treated with the composition of the present invention.
Figure 3B:
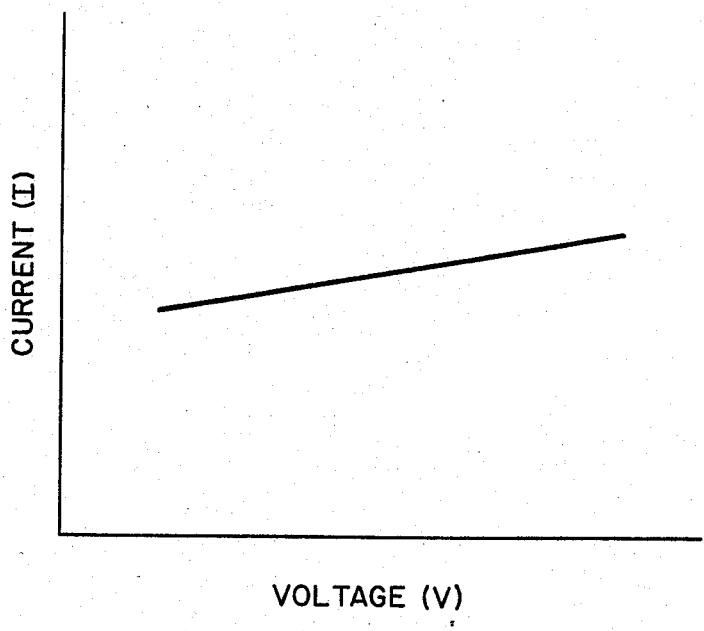

A mixture was prepared from PVP with the above "wet silver" in a 1:1 ratio and tested in a 60 Hz curve tracer with the above described 0.6 mm-gap test device. The results are shown in the FIG. 3. FIG. 3A is the non-linear MOM junction untreated, and FIG. 3B is the junction after application of this mixture. The figures are graphical representations of traces obtained with an oscilloscope before and after the test device was treated with the present composition. The composition clearly provides a linear junction and therefore would eliminate IMI.

In several tests using the procedure described in Example VI, it was found that ascorbic acid and several other reducing agents were as effective as erythorbic acid, but the low cost of erythorbic acid makes it the preferred choice. Hydroxyl amine was additionally found to be somewhat more effective for cupric chloride containing mixtures due to the higher resulting pH, and more effective in the case of iron oxides due to its better reducing properties.

This CBA is particularly useful as a conductive bridge between metal junctions used around communication transmission stations. These junctions typically have metal oxide coatings which interfere with the transmission of electronic signals. The present invention removes the metal oxide and provides a linear current path which does not interfere with signal transmission. The CBA could, however, have other uses such as a general purpose metal oxide remover or as a conductive paint for numerous electronic applications.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for reducing Intermodulation Interference which comprises the steps of:
    contacting a metal-oxide-metal junction with a Chemical Bonding Agent composition comprising between about 10 and 90 percent by weight of a complexing polymer, between about 10 and 80 percent by weight of a solvent, between about 0 and 40 percent by weight of a metal salt, and between about 0 and 35 percent by weight of a reducing agent;
    penetrating the metal-oxide-metal junction by complexing the metal ions in said metal-oxide-metal junction with said complexing polymer;
    reducing said metal ions in said metal-oxide-metal junction to low or zero valent metal thereby producing a conductive mixture and insuring good electrical contact between said composition and said metal-oxide-metal junction; and
    inhibiting future metal-oxide-metal junctions by cross-linking said complexing polymer with said metal ions from said junction thus forming a hardened material which remains in place to form a linear conductive path between the metal-metal junction.

2. The method of claim 1, wherein said complexing polymer in said contacting step is selected from a group consisting of polyamines, acrylamides, ketoamides and linear polyketones.

3. The method of claim 2, wherein said complexing polymer in said contacting step is selected from a group consisting of poly(N-vinylphthalamide) and polyvinyl pyrrolidone.

4. The method of claim 3, wherein said solvent in said contacting step is selected from a group consisting of alcohol and water.

5. The method of claim 4, wherein said metal in said metal salt in said contacting step is selected from the group consisting of silver, copper, zinc, mercury, iron, or cadmium.

6. The method of claim 5, wherein said reducing agent in said contacting step is selected from the group consisting of ascorbic acid, erythorbic acid, and hydroxylamine.

7. The method of claim 6, wherein said composition in said contacting step comprises about 13 percent by weight of PVP, about 13 percent by weight of erythrobic acid, about 6 percent by weight of silver nitrate, and about 68 percent by weight of water.

8. A method for reducing Intermodulation Interference which comprises the steps of:
   contacting a metal-oxide-metal junction with a Chemical Bonding Agent composition comprising between about 13 percent by weight of PVP, about 13 percent by weight of erythrobic acid, about 6 percent by weight of silver nitrate, and about 68 percent by weight of water;
   penetrating the metal-oxide-metal junction by complexing the metal ions in said metal-oxide-metal junction with said complexing polymer;
   reducing said metal ions in said metal-oxide-metal junction to low or zero valent metal thereby producing a conductive mixture and insuring good electrical contact between said composition and said metal surfaces in said junction; and
   inhibiting future metal-oxide-metal junctions by cross-linking said complexing polymer with said metal ions from said junction thus forming a hardened material which remains in place to form a linear conductive path between the metal-metal junction.

* * * * *